United States Patent
Kaushik et al.

(10) Patent No.: US 10,178,570 B2
(45) Date of Patent: Jan. 8, 2019

(54) DYNAMIC APPLICATION BANDWIDTH THROTTLING AND STATION STEERING FOR ACCESS POINTS BASED ON QOE (QUALITY OF EXPERIENCE) ON A WIRELESS NETWORK

(71) Applicant: Fortinet, Inc., Sunnyvale, CA (US)

(72) Inventors: Anil Kaushik, Marathalli (IN);
Pradeep Mohan, Binnamangala (IN);
PC Sridhar, Binnamangala (IN)

(73) Assignee: Fortinet, Inc., Sunnyvale, CA (US)

( * ) Notice: Subject to any disclaimer, the term of this patent is extended or adjusted under 35 U.S.C. 154(b) by 92 days.

(21) Appl. No.: 15/476,903

(22) Filed: Mar. 31, 2017

(65) Prior Publication Data
US 2018/0288635 A1 Oct. 4, 2018

(51) Int. Cl.
*H04W 84/12* (2009.01)
*H04W 24/08* (2009.01)
*H04L 12/26* (2006.01)
*H04L 12/24* (2006.01)
*H04W 28/02* (2009.01)
*H04W 28/20* (2009.01)
*H04W 88/08* (2009.01)

(52) U.S. Cl.
CPC ......... *H04W 24/08* (2013.01); *H04L 41/5067* (2013.01); *H04L 43/028* (2013.01); *H04W 28/0268* (2013.01); *H04W 28/20* (2013.01); *H04W 88/08* (2013.01)

(58) Field of Classification Search
CPC . H04W 84/12; H04W 28/0289; H04W 28/08; H04W 28/26; H04W 28/02; H04W 28/0284
See application file for complete search history.

(56) References Cited

U.S. PATENT DOCUMENTS

| | | | |
|---|---|---|---|
| 2015/0117206 A1* | 4/2015 | Radulescu | H04L 43/10 370/235 |
| 2015/0326901 A1* | 11/2015 | Tiraspolsky | H04N 21/472 725/31 |
| 2016/0036710 A1* | 2/2016 | Hanaoka | H04W 28/0284 370/235 |

* cited by examiner

*Primary Examiner* — Mewale A Ambaye
(74) *Attorney, Agent, or Firm* — Law Office of Dorian Cartwright; Dorian Cartwright (57) ABSTRACT

Application bandwidth is dynamically throttled and/or stations are steered to different access points to maintain optimal QoE for stations on a wireless network. Responsive to a determination that the available bandwidth for the one or more applications is below a threshold for station QoE application minimum bandwidth, the current QoE station index is updated. Responsive to a determination that the current QoE station index is below a system determined QoE level, throttling the one or more applications of the station which were below a threshold for station QoE application bandwidth allocation or steering the station to a new access point.

2 Claims, 6 Drawing Sheets

| Application | Minimum Bandwidth for Satisfactory QoE | Default Weightage |
|---|---|---|
| Youtube | 2 Mbps | 3 |
| Facebook | 512 Kbps | 2 |
| FTP Transfer | 128 Kbps | 1 |
| Gmail | 512 Kbps | 3 |
| Lync Video Call | 4 Mbps | 4 |
| Netflix | 2 Mbps | 2 |
| Outlook | 2 Mbps | 5 |
| Linkedin | 512 Kbps | 2 |
| FB Messenger | 512 Kbps | 2 |
| Whatsapp | 512 Kbps | 2 |

*FIG. 4*

| STA MAC | Identified Application | Actual BW |
|---|---|---|
| 00:00:00:00:00:01 | Youtube | 512 Kbps |
| 00:00:00:00:00:01 | Facebook | 512 Kbps |
| 00:00:00:00:00:01 | FTP Transfer | 128 kbps |
| 00:00:00:00:00:01 | Outlook | 512 Kbps |
| 00:00:00:00:00:02 | Lync Video Call | 4 Mbps |
| 00:00:00:00:00:02 | Netflix | 2 Mbps |
| 00:00:00:00:00:02 | Gmail | 512 Kbps |
| 00:00:00:00:00:03 | Linkedin | 512 Kbps |
| 00:00:00:00:00:03 | Facebook Messenger | 128 Kbps |
| 00:00:00:00:00:03 | Whatsapp | 128 Kbps |

*FIG. 5*

| STA MAC | Current QoE Index(Predicted) |
|---|---|
| 00:00:00:00:00:02 | 100 |
| 00:00:00:00:00:03 | 96 |
| 00:00:00:00:00:01 | 91 |

DYNAMIC APPLICATION BANDWIDTH THROTTLING AND STATION STEERING FOR ACCESS POINTS BASED ON QOE (QUALITY OF EXPERIENCE) ON A WIRELESS NETWORK

FIELD OF THE INVENTION

The invention relates generally to computer networking, and more specifically, to dynamic application bandwidth throttling and/or station steering for access points based on QoE (quality of experience) on a wireless network.

BACKGROUND

Wireless devices such as smart phones and tablet computing devices continue to proliferate, adding to the total number of mobile devices that seek pervasive Wi-Fi connectivity. The rapid introduction of advancing apps and Internet use on these mobile devices adds to the challenge of network support in an enterprise environment. In particular, enterprises are faced with significant challenges in identifying best practices in their build out of their wireless local area network (WLAN) environment.

WLAN networks deal with unpredictable traffic and dynamic RF situations (e.g., variable signal strength) which result in unpredictable required bandwidth for data transmission over the air. Typically, this kind of demand for bandwidth is typically handled by known techniques of buffering and/or bandwidth over provisioning. For example, there may be a WLAN where there are Voice Over IP (VoIP) clients as well clients gaming applications. In this example we can safely assume that VoIP clients will use the channel linearly while the gaming clients will see peaks in wireless usage. During the peaks of WLAN usage by the gaming clients, the access point of the WLAN will struggle to keep the Quality of Service (QoS) above the agreed level. In some situations, if there are an increased number of gaming clients, even VoIP clients may end up not receiving the required Quality of Experience (QoE).

The 802.11e protocol, promulgated by the Institute of Electrical and Electronic Engineers (IEEE), provides the mechanism to define the QoS requirement and access point manages the traffic according to application QoS requirement. However, the RF condition and traffic data remain so unpredictable that there is need for a better strategy to introduce a well-designed QoE support solution that can quickly respond to the high fluctuated network traffic before the QoE goes below the satisfactory level. WLAN is becoming the defacto standard for accessing networks and there is a flood of devices accessing the network with bandwidth intensive applications.

What is needed is a robust technique dynamic application bandwidth throttling and/or station steering for access points based on QoE (quality of experience) on a wireless network.

SUMMARY

These shortcomings are addressed by the present disclosure of methods, computer program products, and systems for dynamic application bandwidth throttling and/or station steering for access points based on QoE (quality of experience) on a wireless network.

In one embodiment, traffic data is received from each of the one or more stations. Applications running on the one or more stations are identified from the traffic data using deep packet inspection, wherein each of the one or more applications has corresponding available bandwidth data stored. Current QoE station index and QoE application minimum bandwidth values for the stations are received from a QoE station database. The QoE application minimum bandwidth values can have corresponding QoE penalty weightage.

In another embodiment, for each station, it is determined if the available bandwidth for any of the one or more applications is below a threshold for station QoE application minimum bandwidth. Responsive to a determination that the available bandwidth for the one or more applications is below a threshold for station QoE application minimum bandwidth, the current QoE station index is updated.

In still another embodiment, it is determined if the current QoE station index is below a system determined QoE level. Responsive to a determination that the current QoE station index is below a system determined QoE level, throttling the one or more applications of the station which were below a threshold for station QoE application bandwidth allocation or steering the station to a new access point.

Advantageously, the wireless network operates more bandwidth efficient utilizing dynamic application bandwidth throttling/steering of clients based on a predictive QoE.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for dynamic application bandwidth throttling and/or station steering for access points based on QoE (quality of experience) on a wireless network. One of ordinary skill in the art will recognize many additional variations made possible by the succinct description of techniques below.

Systems for Application Throttling and/or Station Steering (FIGS. 1-6)

Figure 1:
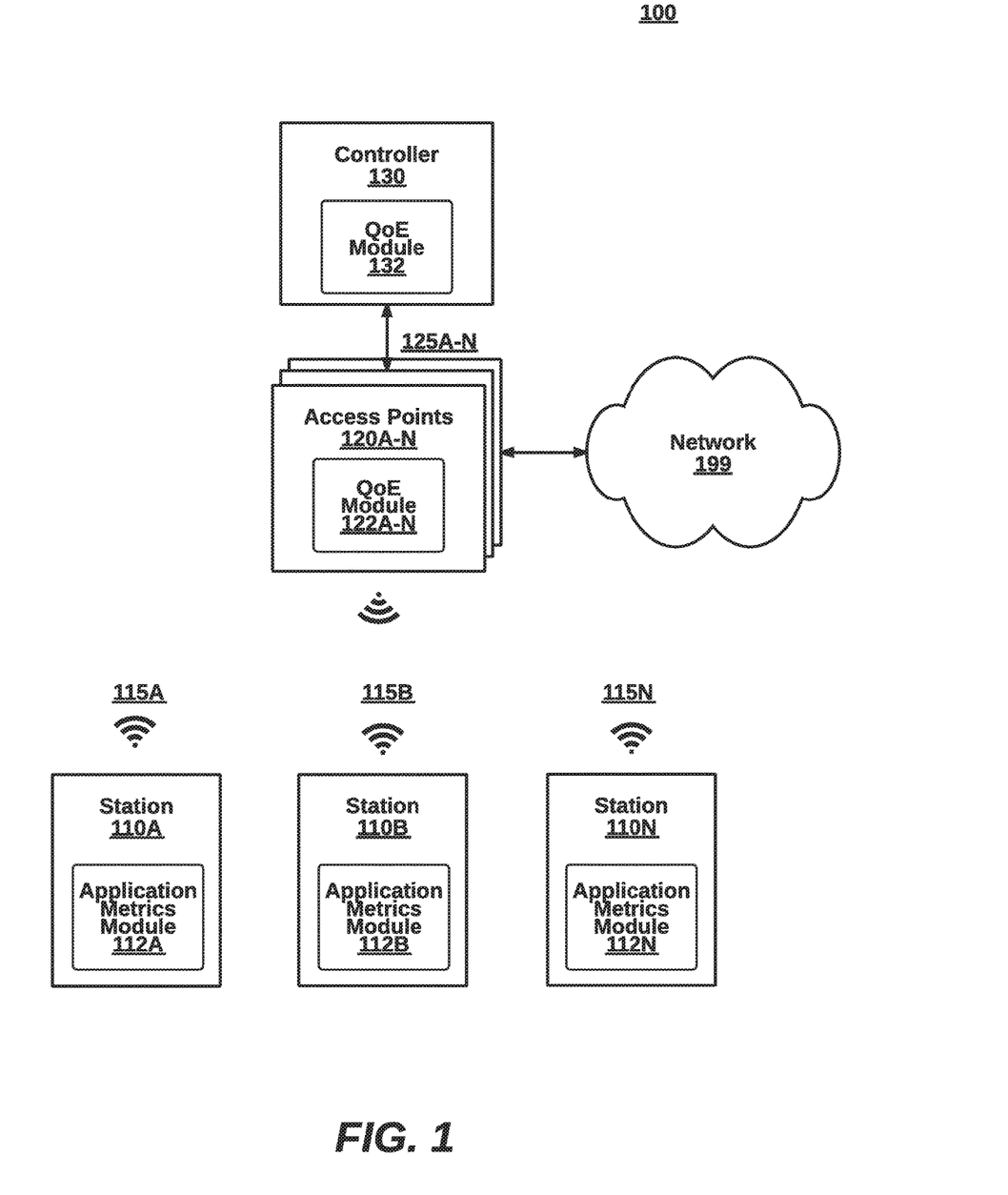
FIG. 1 is a high-level block diagram illustrating a system to illustrate dynamic application bandwidth throttling/steering based on a station QoE index.

FIG. 1 is a high-level block diagram illustrating a system 100 for dynamic application bandwidth throttling/steering based on Quality of Experience (QoE), according to one embodiment. The system 100 comprises a controller (130), access points (120A-N), and stations 110A-N having varying capabilities.

Network components can be directly or indirectly coupled to a network 199, such as a LAN (local access network, a WAN (wide area network), the Internet, a cellular network, through any suitable wired (e.g., Ethernet) or wireless (e.g., Wi-Fi or 4G) medium, or combination. The stations 110A-N are coupled by Wi-Fi connection to the access point 120A-N which in turn is connected to the network 199 (i.e., to network backbone components therein), through a wired or wireless connection. Finally, the controller 130 is also connected to the network 199, through a wired or wireless connection. Many variations are possible. For example, there can be additional components such as firewalls, routers, and more switches and stations. Additionally, components can be implemented with a single physical box, or, each could represent a cluster of physical boxes acting in coordination. The system 100 can be implemented locally as a LAN or be implemented in the cloud with certain components being remotely available (e.g., through a firewall). Wi-Fi components can communicate using IEEE 802.11 protocols, including IEEE 802.11n and IEEE 802.11ac. The system 100 functions without a controller 130 in some embodiments.

In operations, the access point 120A-N functions to receive traffic data flow from the stations 110A-N as both modules are coupled through the network by wireless interface (115A-N).

Figure 4:
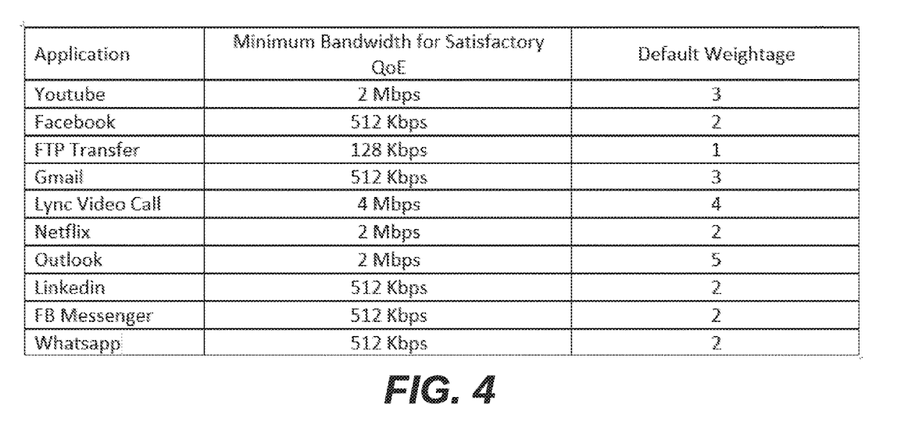
FIG. 4 is a table illustrating the applications running on all stations connected to an access point and the corresponding data rate, according to one embodiment.

The traffic data flow includes data of application(s) running on the stations, including corresponding available bandwidth. Additional information may be readily available such as data rate of the application. FIG. 4 illustrates the type of traffic data flow received at the access point. FIG. 4 is a table illustrating the applications running, on all stations connected to an access point and the corresponding data rate, according to one embodiment. The first column of the table provides the media access control (MAC) address of the stations. The second column lists the type of application of the traffic data flow. The third column lists the current data rate for the particular application.

At the access point, the receipt of the traffic data flow is identified for each of the stations by comparing the traffic data flow to QoE application listing and minimum bandwidth values. The QoE application minimum bandwidth values are stored in in a QoE station database. The QoE station database may be stored within the access point, containing QoE application listings and minimum bandwidth values for all stations.

Identification of the traffic data flow, in some embodiments, is ascertained by Deep Packet Inspection (DPI) which, in addition to inspecting the source and destination headers of the packet as conventional inspection, inspects the data layer of the packet to determine the specific type of data within the packet. The traffic data flow, inspected by DPI, is compared with the QoE application listing to match the traffic data flow as a specific type of application.

An administrator, in some embodiments, will initially configure the QoE application listing within the QoE station database with the full list of exhaustive applications which are to be determined from the traffic data flow. In some situations the traffic data flow is unknown when compared to the QoE application listing. In this case, the administrator may add new applications to the application listing in order to expand the QoE application listing to account for additional unknown traffic data flows.

Figure 5:
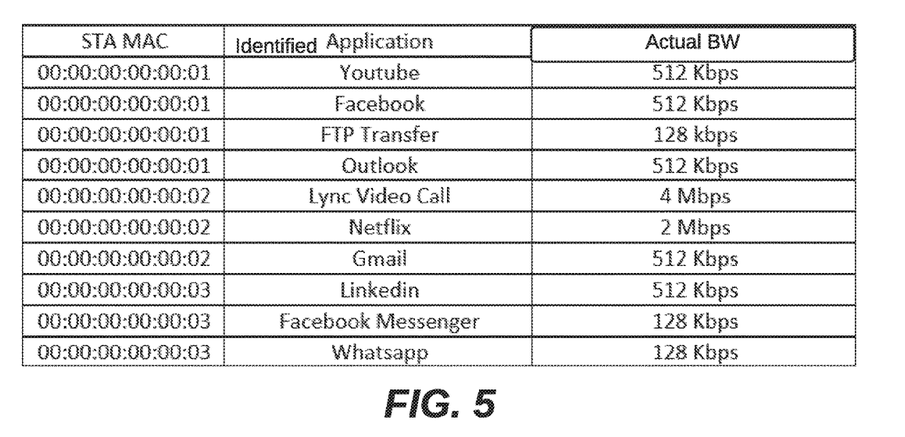
FIG. 5 is a table illustrating application minimum bandwidth for satisfactory QoE and corresponding default weight values, according to one embodiment.

For example, in FIG. 4, station 2 (MAC 00:00:00:00:00:02) sends traffic data flow information to an access point. The access point assesses the traffic data flow through DPI and identifies applications which include Lync Video Call, Netflix, and Gmail. The QoE application listing, stored within the access point, has a corresponding QoE penalty weightage for each application, for example as shown in FIG. 5. The table in FIG. 5 illustrates application minimum bandwidth for satisfactory QoE and corresponding default weight values stored as a QoE application listing, according to one embodiment. The QoE application listing's first column lists the particular type of application. The second column lists the minimum bandwidth for satisfactory QoE for the particular application. The third column lists the corresponding default weight values for the particular application.

The access point further functions to retrieve a current QoE station index and QoE application minimum bandwidth values for the one or more stations from a QoE station database. The QoE application minimum bandwidth values have been discussed above.

QoE, as referred to herein, expresses network performance from a station perspective as experienced by a user. As shown in FIG. 5 in the QoE application listing, each application has a minimum bandwidth for satisfactory QoE. By ensuring that the data rate at the stations for each application is above the minimum level, a QoE can be effectively provided to the stations.

Figure 6:
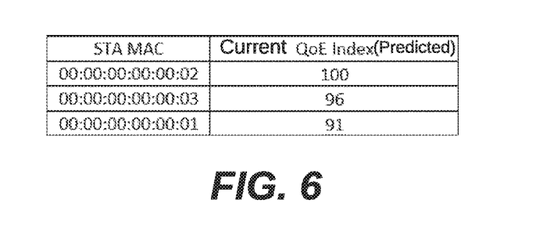
FIG. 6 is a table illustrating an updated listing of the QoE values for each station connected to an access point, according to one embodiment.

A listing of QoE values is maintained by the system and may be stored in the access point in some embodiments. The current QoE station index is initially given a default value, for example '100'. An administrator may assign the initial QoE value accordingly, in other instances. In some embodiments, all stations have the same initial QoE value assigned. In other embodiments, some stations may have different initial QoE values from each other. Stations with different initial QoE values may be advantageous in design in order to bias preference for certain access points. The listing of QoE values is maintained in a table format, an example of which can be seen in FIG. 6. The table of FIG. 6 illustrates an updated listing of the Quality of Experience (QoE) values for each station connected to an access point, according to one embodiment. For example, station 2 (MAC 00:00:00:00:00:02) still maintains an initial QoE value of 100, while station 3 (MAC 00:00:00:00:00:03) and station 1 (MAC 00:00:00:00:00:01) have adjusted QoE values of 91 and 96 respectively.

The access point further functions to determine if available bandwidth for the applications is below a threshold for station QoE application minimum bandwidth. If it is found to be below the threshold, the current QoE station index must be updated. This is accomplished by subtracting the difference between current QoE station index and the corresponding QoE penalty weightage of the applications which are below the threshold for station QoE application minimum bandwidth. For example looking at FIG. 4, station 2 has traffic data flow of Lync Video Call, Netflix, and Gmail. For this example, station 2 has an initial QoE station index of 100. Looking at FIG. 5, there is a stated minimum bandwidth QoE for each QoE application listing. It can be seen that both Lync Video Call and Netflix are functioning properly as the data rate in FIG. 4 matches the minimum QoE value shown in FIG. 5. However, Outlook has a minimum bandwidth of satisfactory QoE of 2 Mbps as stated in FIG. 5, however, looking at FIG. 4, the Outlook data rate is 512 Kbps. This suggests the bandwidth is insufficient for the requisite QoE. Therefore, the initial QoE station index of 100 requires adjustment by subtracting the pre-determined weighting value from the initial QoE station index of 100. The new current QoE station index would be 100−5=95 (as 5 is the pre-determined weighting value for Outlook).

In some embodiments, in the event that there are multiple determinations that a particular application of the station falls below a threshold for station QoE minimum bandwidth, the current QoE station index is adjusted further by adding an additional weighting penalty. The additional weighting penalty may be a particular value or an increased weighting with each incremental determination that the particular application of the station falls below a pre-determined threshold bandwidth value. If the current QoE station index is below threshold, in some embodiments, the access point implements throttling of the applications of the station which were below a threshold for station QoE application bandwidth allocation. After throttling, there may be a redetermination, for each station, to check if the available bandwidth for the applications is below a threshold for station QoE application minimum bandwidth. In the available bandwidth is below threshold, the current QoE station index is updated by subtracting the difference between current QoE station index and the corresponding QoE penalty weightage of the applications below threshold. Moreover, there is a redetermination using the newly updated current QoE station index to see whether it is below the system determined QoE level. Given the application has previously been throttled, in the even that the current QoE station index is below the system determined QoE level, the entire station is steered away from the access point. This is done in prediction of increased QoE of the station once it is steered away from the access point. In some instances, the system determined QoE level is determined by the administrator.

In other embodiments, the station is not eligible for steering if the station is running a high priority application. Accordingly, the station is assigned a no steering value which tells the access point, neighboring access point, and/or controller that the current station is ineligible for steering.

In yet other embodiments, it may be advantageous to throttle the bandwidth of the station to maintain a requisite level of QoE in place of steering. In such cases, even during redetermination, in a finding that the current QoE station index is below a system determined QoE level, the result will be throttling in place of steering. The administrator may implement pre-determined rules as for whether the access point steers or throttles.

Additional embodiments of the access point 120A-N are described below in association with FIG. 2.

The controller 130 may be implemented in system 100 to facilitate any or all of the functionality of the access point in some embodiments. For example, the controller, instead of the access point, may be configured to identify the traffic data flow in place of the access point. Similar to the access point in operations, the controller 130 receives traffic data flow from the stations 110A-N as both modules are coupled through the network 199. The controller would then communicate with the access points as there are communicatively coupled (125A-N), as shown in FIG. 1. In some embodiments, the controller is configured to assign the system determined QoE level and calculate the current QoE station index, similar to the access point methodology described above. In some embodiments, the controller is configured to determine whether the access point steers or throttles based on current QoE station index.

Figure 3:
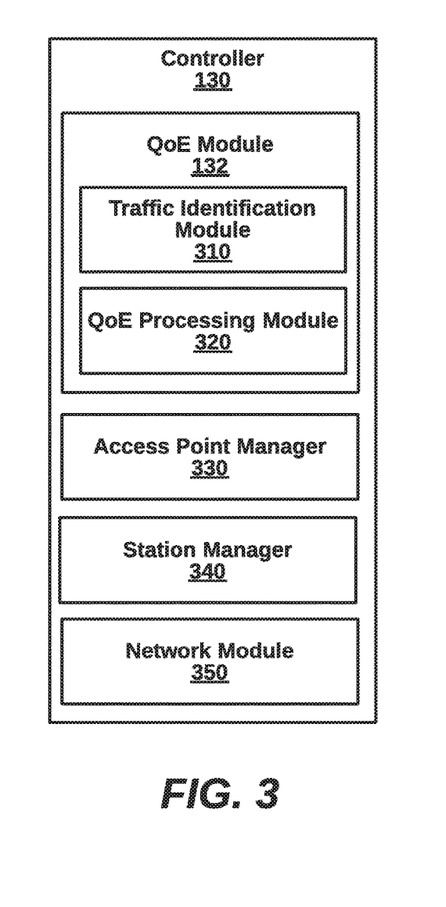

Additional embodiments of the controller 130 are set forth in FIG. 3.

The stations 110A-N of the system 100 are wirelessly coupled 115A-N to the access points 120A-N. The stations run applications and include an application metrics module 112A-N which functions to maintain a listing of the applications used and corresponding data rate. This information is sent along with operational application traffic data flow to the access points.

Figure 2:
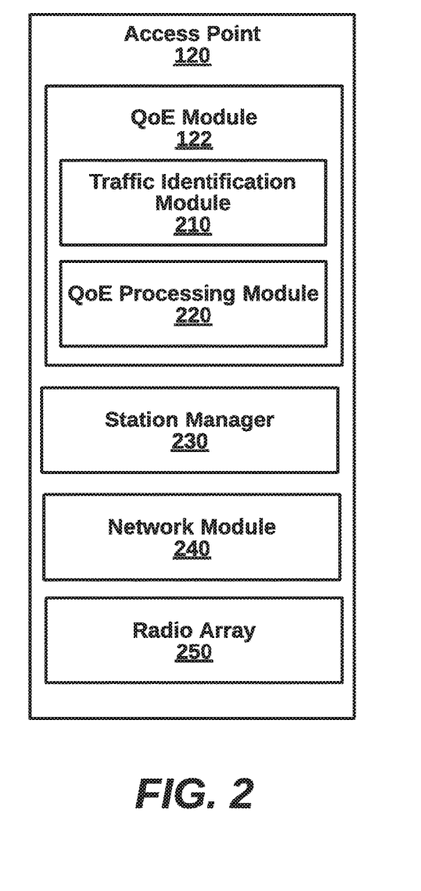
FIGS. 2-3 are more detailed block diagrams illustrating an access point and a controller of the system of FIG. 1, respectively, according to some embodiments.

FIG. 2 is a more detailed block diagram illustrating an access points 120 representative of the access points 120A-N of the system 100, according to one embodiment. The access point 120 includes a traffic a QoE module 122, a station manager 230, a network module 240, and a radio array 250. The components can be implemented in hardware, software, or a combination of both.

The QoE module 122 includes two sub-modules including a traffic identification module 210 and the QoE processing module 220. The traffic identification module 210 implements traffic data flow identification with, for example, deep packet inspection. The QoE processing module 220 determines a station QoE index for stations. The station QoE index estimates user experience based on reserved bandwidth for currently running applications, so that improvements can be made preemptively.

The station manager 230 manages station connections. Beacons are periodically transmitted to advertise an SSID. Upon being contacted by a station within range, a connection protocol is performed. Station MAC addresses for connected stations are stored in a table. In some embodiments, the controller 130 is notified of connected stations . . . The network module 240 and radio array 250 provide hardware and software for transmitting data under TCP/IP protocol over an Ethernet line or alternatives.

FIG. 3 is a more detailed block diagram illustrating the controller 130. The controller 130 includes a QoE module 132, an access point manager 330, a station manager 340, a network module 350, and a radio array 360. The components can be implemented in hardware, software, or a combination of both.

The QoE module 132 includes a traffic identification module 310 and a QoE processing module 320. Similar to the access point, the traffic identification module 310 implements traffic data flow identification by comparing the received the traffic data flow with the QoE application listing. The QoE calculation module 320 provides both system determined QoE level for stations, as well as computes the current QoE station indexes for the stations, as discussed above. In various embodiments, access point can offload local processing to the controller, and visa versa.

The access point manager 330 communicates with the access points 120A-N for network functionality including steering stations between access points and throttling stations through specific access points. The station manager 340 manages individual stations connected to managed access points. For example, restrictions on individual stations is implemented by tracking MAC numbers of stations and continuing policies as stations are handed-off to new access points. The network module 350 operate similar to the network array 240 of the access point 120. This coupling may be accomplished by the network interface 944 in the exemplary computing device of FIG. 9.

Figure 7:
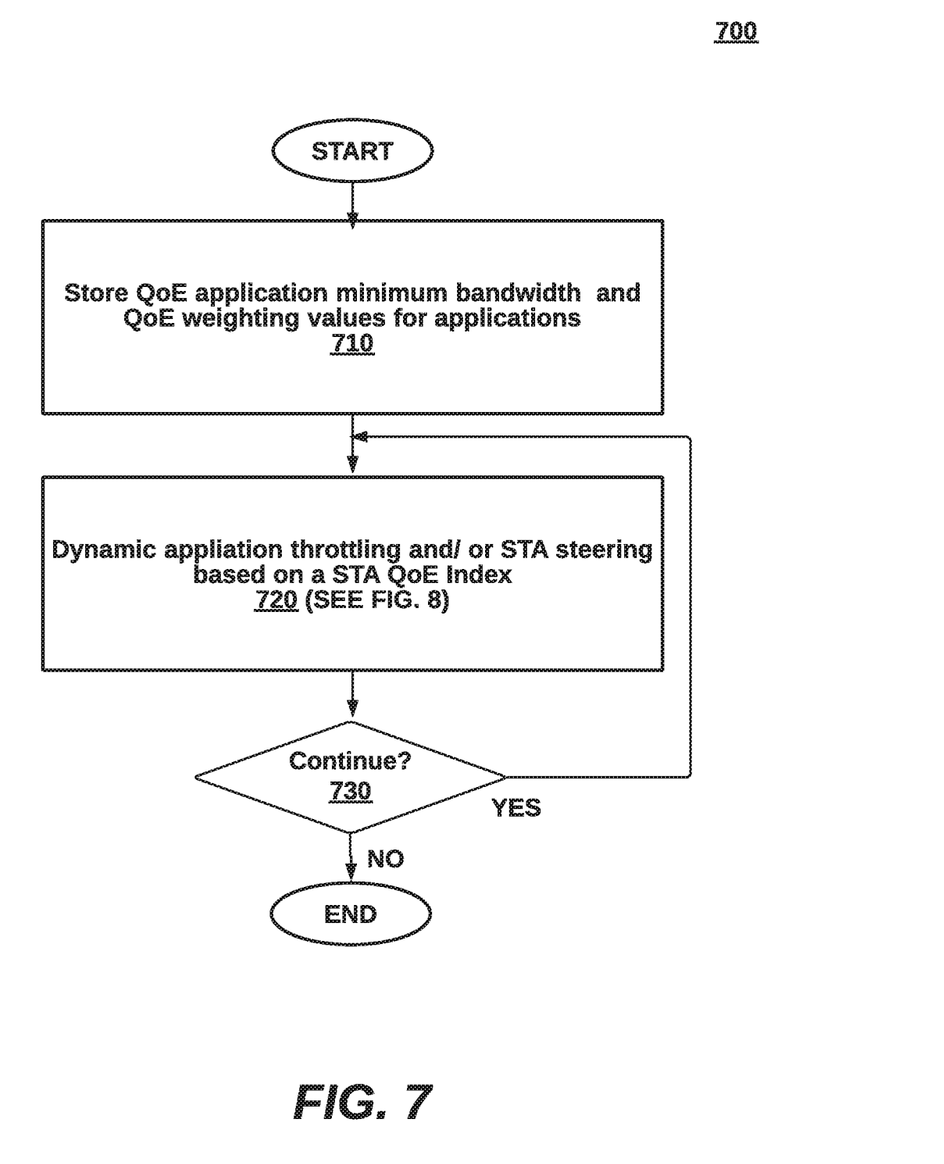
FIG. 7 is a high-level flow diagram illustrating a method for preemptively managing QoE of stations connected to an access point, according to one embodiment.
Figure 8:
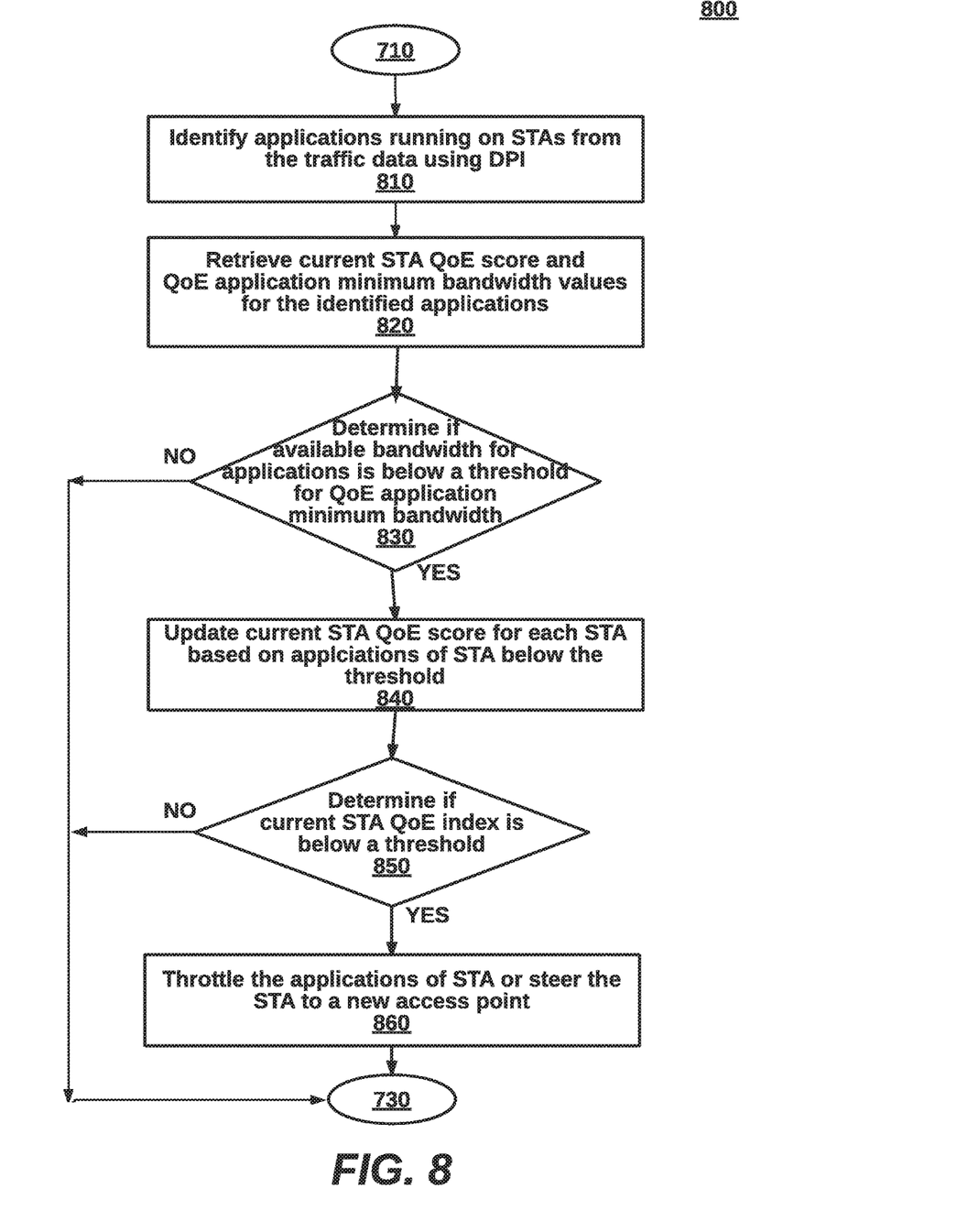
FIG. 8 is a detailed flow diagram illustrating a step for dynamic application throttling and or station steering based on a station QoE index, according to one embodiment.

Methods for Application Throttling and/or Station Steering (FIG. 7-8)

FIG. 7 is a high-level flow diagram illustrating a method 700 for dynamic application throttling and/or station steering based on a station QoE index, according to one embodiment. The method 700 is one example of the operation for the system 100. One of ordinary skill in the art will recognize that the method 700 is non-limiting as other embodiments can have more or less steps and can be performed in a different order.

At step 710, guaranteed QoS values by an access point is configured for each application to optimize QoE of a station. At step 720, predicted QoE is monitored for each station based on an actual QoS bandwidth allocated to each application. Optionally, metrics can be received from stations with actual QoE data. Further details of step 720 are discussed below with respect to FIG. 8. The process continues 730 until closed or until an access point reboots or powers down. QoE index for a station can be initially 100 and downgraded for underperforming. After application throttling or client steering, the QoE index can be re-evaluated to determine whether further action is necessary.

FIG. 8 is a detailed flow diagram illustrating the step 720 for dynamic application throttling and or station steering based on a station QoE index, according to one embodiment.

At step 810, applications running on stations are identified form traffic using, for example, deep packet inspection. Content fields of network packets can be examined to fingerprint application layer programs.

At step 820, a current station QoE index is retrieved for updating. An initial score can be 100. QoE application minimum bandwidth values for identified applications can be retrieved from a database, along with QoE weighting, as showing in FIG. 4.

At step 830, it is determined if available bandwidth actually assigned to applications at an access point is below a threshold, as shown in FIG. 5, a current station QoE index is updated for stations below the threshold, at step 840. At step 850, if the overall station QoE index, based on the individual application statuses, is below a threshold, application throttling or station steering to a new access point is implemented, at step 860.

In one embodiment, applications for a specific station are throttled one at a time until the QoE index rises above the threshold. If the QoE remains below the threshold, the application may need to be steered to a new access point. In other embodiments only station steering is used to raise QoE indexes. In yet another embodiment, a controller can predict how station steering will affect one or more access points and their own station QoE values, in determining which access point to steer to. In one case, no steering is performed because the other access points are already overburdened. In still other cases, station are weighted so that a CEO or important meeting will not be affected. Thus, one station can be steered or throttled as a result of unsatisfactory QoE for a different station. Additionally, throttling can vary in degrees all the way up to completely throttling, which effectively discontinues the application.

Figure 9:
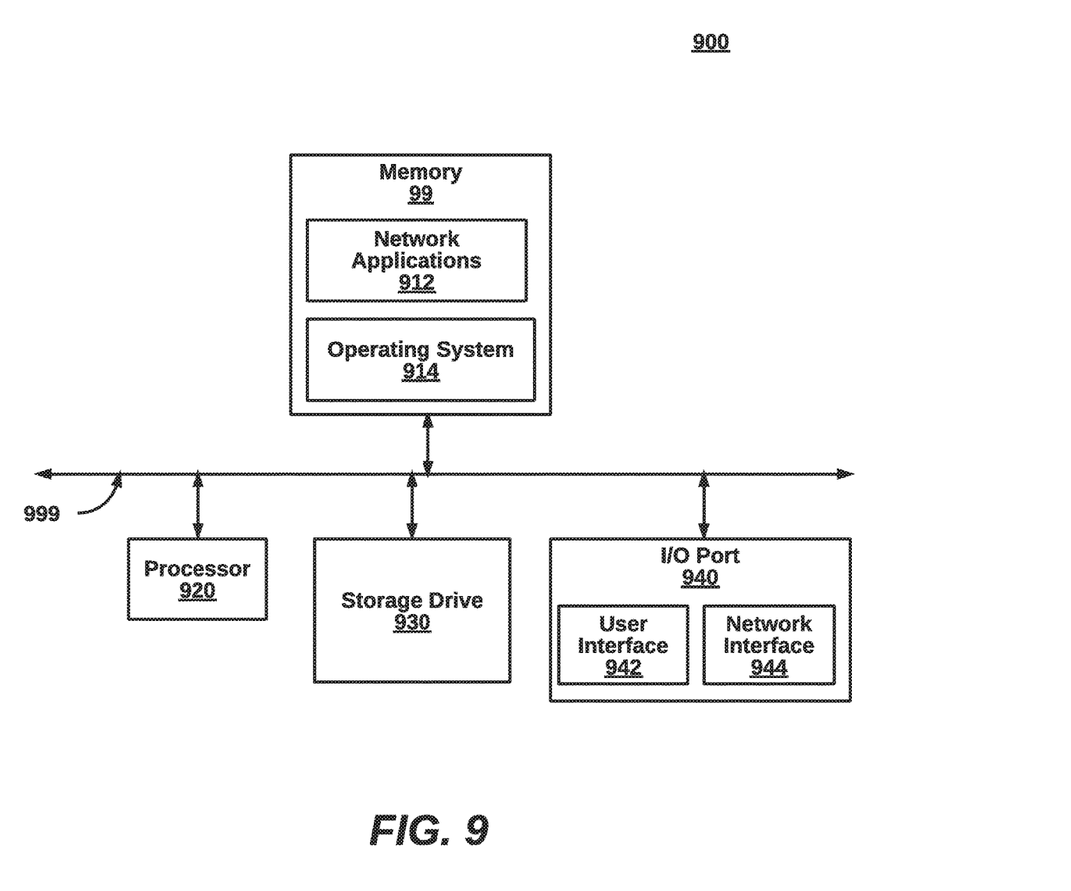
FIG. 9 is a block diagram illustrating an example computing device, according to one embodiment.

Generic Computing Device (FIG. 9)

FIG. 9 is a block diagram illustrating an example computing device 900 for use in the system 90 of FIG. 1, according to one embodiment. The computing device 900 can be implemented for each of the components of the system 100, including the Wi-Fi controller 130, the access points 120A-N, and the stations 19A-N. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of the Controller 130, or the access points 120A-N, as illustrated in FIGS. 4-6. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 99 or the storage drive 930.

The storage drive 930 can be any non-volatile type of storage such as a magnetic disc, EEPROM (electronically erasable programmable read-only memory), Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an access point of a wireless network, for dynamic application bandwidth steering of one or more stations based on quality of experience (QoE) to neighboring access points, the computer-implemented method comprising:

receiving traffic data from each of the one or more stations;

identifying one or more applications running on the one or more stations from the traffic data using deep packet inspection, wherein each of the one or more applications has corresponding available bandwidth data stored;

retrieving current of station index and QoE application minimum bandwidth values for the one or more stations from a QoE station database, wherein the QUE application minimum bandwidth values have corresponding QoE penalty weightage;

determining, for each station, if the available bandwidth for any of the one or more applications is below a threshold for station QoE application minimum bandwidth;

in response to a determination that the available bandwidth for the one or more applications is below a threshold for station QoE application minimum bandwidth, updating the current QoE station index; determining if the current QoE station index is below a system determined QoE level; and in response to a determination that the current QoE, station index is below a system determined QoE level, throttling the one or more applications of the station which were below a threshold for station QUE, application bandwidth allocation or steering the station to a new access point.

2. A non-transitory computer-readable media storing instructions that, when executed by a processor, perform a computer-implemented method, in an access point of a wireless network, for dynamic application bandwidth steering of one or more stations based on quality of experience (QoE) to neighboring access points, the computer-implemented method comprising:

receiving traffic data from each of the one or more stations;

identifying one or more applications running on the one or more stations from the traffic data using deep packet inspection, wherein each of the one or more applications has corresponding available bandwidth data stored;

retrieving current QoE station index and QoE application minimum bandwidth values for the one or more stations from a QoE station database, Wherein the QoE application minimum bandwidth values have corresponding QoE penalty weightage;

determining, for each station, if the available bandwidth for any of the one or more applications is below a threshold for station QoE application minimum bandwidth;

in response to a determination that the available bandwidth for the one or more applications is below a threshold for station QoE application minimum bandwidth, updating the current QoE station index; determining if the current QoE station index is below a system determined QoE level; and in response to a determination that the current QoE station index is below a system determined QoE level, throttling the one or more applications of the station which were below a threshold for station QoE application bandwidth allocation or steering the station to a new access point.

* * * * *